US012231246B2

(12) United States Patent
Joseph et al.

(10) Patent No.: US 12,231,246 B2
(45) Date of Patent: Feb. 18, 2025

(54) HARQ PROCESS IDENTIFIER DETERMINATION

(71) Applicant: QUALCOMM Incorporated, San Diego, CA (US)

(72) Inventors: Vinay Joseph, Calicut (IN); Rajat Prakash, San Diego, CA (US); Seyed Ali Akbar Fakoorian, San Diego, CA (US); Linhai He, San Diego, CA (US); Seyedkianoush Hosseini, San Diego, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/340,298

(22) Filed: Jun. 23, 2023

(65) Prior Publication Data

US 2023/0421304 A1  Dec. 28, 2023

Related U.S. Application Data

(63) Continuation of application No. 16/948,599, filed on Sep. 24, 2020, now Pat. No. 11,728,937.
(Continued)

(51) Int. Cl.
*H04W 72/04* (2023.01)
*H04L 1/1812* (2023.01)
(Continued)

(52) U.S. Cl.
CPC ....... *H04L 1/1819* (2013.01); *H04W 72/0446* (2013.01); *H04W 72/23* (2023.01); *H04W 72/535* (2023.01); *H04W 76/27* (2018.02)

(58) Field of Classification Search
CPC ............. H04W 72/535; H04W 72/042; H04W 72/0446; H04W 72/0453; H04W 76/27;
(Continued)

(56) References Cited

U.S. PATENT DOCUMENTS 10,575,299 B2 *  2/2020  Ying .................... H04W 72/23
2011/0312328 A1  12/2011  Choi et al.
(Continued)

FOREIGN PATENT DOCUMENTS

CN         104158640 A      11/2014

OTHER PUBLICATIONS

Catt: "Further Discussion on Multiple Active SPS/CGs", 3GPP Draft, 3GPP TSG-RAN WG2 Meeting #107, R2-1908823, 3rd Generation Partnership Project (3GPP), Mobile Competence Centre, 650, Route Des Lucioles, F-06921 Sophia-Antipolis Cedex, France, vol. RAN WG2, No. Prague. Czech Republic, Aug. 26, 2019-Aug. 30, 2019, Aug. 16, 2019 (Aug. 16, 2019), XP051766645, 5 pages, paragraph [0002]-paragraph [02.4].
(Continued)

*Primary Examiner* — Wei Zhao
(74) *Attorney, Agent, or Firm* — Arun Swain

(57) ABSTRACT

Various aspects of the present disclosure generally relate to wireless communication. In some aspects, a user equipment (UE) may determine a hybrid automatic repeat request (HARQ) process identifier for a communication between the UE and a base station using a semi-persistent scheduling (SPS) configuration or a configured grant (CG) configuration, wherein the determination of the HARQ process identifier is based at least in part on an offset applied for the determination of the HARQ process identifier; and perform the communication based at least in part on the HARQ process identifier. Numerous other aspects are provided.

30 Claims, 7 Drawing Sheets

Related U.S. Application Data

(60) Provisional application No. 62/906,631, filed on Sep. 26, 2019.

(51) Int. Cl.
*H04W 72/0446* (2023.01)
*H04W 72/23* (2023.01)
*H04W 72/50* (2023.01)
*H04W 76/27* (2018.01)

(58) Field of Classification Search
CPC ........... H04W 68/005; H04W 72/1289; H04W 72/1273; H04L 1/1819
See application file for complete search history.

(56) References Cited

U.S. PATENT DOCUMENTS

| | | | |
|---|---|---|---|
| 2013/0195036 A1* | 8/2013 | Quan | H04W 72/542 |
| | | | 370/329 |
| 2013/0294318 A1 | 11/2013 | Amerga et al. | |
| 2014/0056163 A1 | 2/2014 | Kwon et al. | |
| 2021/0083806 A1* | 3/2021 | Zou | H04L 1/1819 |
| 2021/0099257 A1 | 4/2021 | Joseph et al. | |
| 2021/0219329 A1* | 7/2021 | Zhou | H04L 1/189 |
| 2022/0116152 A1 | 4/2022 | Iyer et al. | |

OTHER PUBLICATIONS

Huawei., et al., "Determination of HARQ Process ID for a CG/SPS Occasion", 3GPP Draft, 3GPP Tsg-Ran WG2 Meeting 106, R2-1910822, Determination of HARQ Process ID for a CG or SPS Occasion. 3rd Generation Partnership Project (3GPP), Mobile Competence Centre, 650, Route Des Lucioles, F-06921 Sophia-Antipolis, vol. RAN WG2, No. Prague. Czech Republic, Aug. 26, 2019-Aug. 30, 2019, Aug. 16, 2019 (Aug. 16, 2019), XP051768589, 3 pages, paragraph [0002].

International Search Report and Written Opinion—PCT/US2020/070584—ISA/EPO—Dec. 18, 2020.

International Preliminary Report on Patentability—PCT/US2020/070584 The International Bureau of WIPO—Geneva, Switzerland, Apr. 7, 2022.

NTT DOCOMO., et al., "Thursday Offline Discussion for 7.2.6.6 Enhanced UL Configured Grant Transmission", 3GPP Draft, 3GPP TSG RAN WG1 Meeting #97, R1-1907923, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 20, 2019 (May 20, 2019), XP051740181, 18 Pages, paragraph [0002]-paragraph [0006].

Vivo: "Discussion on the HARQ Process Calculation on Multiple Active CGs", 3GPP Draft, 3GPP TSG-RAN WG2 Meeting #105bis, R2-1903598, Discussion on the HARQ Process Calculation on Multiple Active CGs, 3rd Generation Partnership Project (3GPP), Mobile Competence Centre, 650, Route Des Lucioles, F-06921 Sophia, vol. RAN WG2, No. Xi 'an, China, Apr. 8, 2019-Apr. 12, 2019, Apr. 6, 2019 (Apr. 6, 2019), XP051700941, 2 pages, paragraph [0002]-paragraph [0003].

European Search Report—EP24171949—Search Authority—The Hague—Aug. 2, 2024.

* cited by examiner

HARQ PROCESS IDENTIFIER DETERMINATION

CROSS-REFERENCE TO RELATED APPLICATION

This application is a continuation of U.S. patent application Ser. No. 16/948,599 filed Sep. 24, 2020, which claims priority to U.S. Provisional Patent Application No. 62/906,631, filed on Sep. 26, 2019, and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for hybrid automatic repeat request (HARQ) process identifier determination.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining a hybrid automatic repeat request (HARQ) process identifier for a communication between the UE and a base station using a semi-persistent scheduling (SPS) configuration or a configured grant (CG) configuration, wherein the determination of the HARQ process identifier is based at least in part on an offset applied for the determination of the HARQ process identifier; and performing the communication based at least in part on the HARQ process identifier.

In some aspects, a method of wireless communication, performed by a base station, may include determining a HARQ process identifier for a communication between the base station and a UE using a SPS configuration or a CG configuration, wherein the determination of the HARQ process identifier based at least in part on an offset applied for the determination of the HARQ process identifier; and performing the communication based at least in part on the HARQ process identifier.

In some aspects, a UE for wireless communication may include memory and one or more processors operatively coupled to the memory. The memory and the one or more processors may be configured to determine a HARQ process identifier for a communication between the UE and a base station using an SPS configuration or a CG configuration, wherein the determination of the HARQ process identifier is based at least in part on an offset applied for the determination of the HARQ process identifier; and performing the communication based at least in part on the HARQ process identifier.

In some aspects, a base station for wireless communication may include memory and one or more processors operatively coupled to the memory. The memory and the one or more processors may be configured to determine a HARQ process identifier for a communication between the base station and a UE using a SPS configuration or a CG configuration, wherein the determination of the HARQ process identifier based at least in part on an offset applied for the determination of the HARQ process identifier; and perform the communication based at least in part on the HARQ process identifier.

In some aspects, a non-transitory computer-readable medium may store one or more instructions for wireless communication. The one or more instructions, when executed by one or more processors of a UE, may cause the one or more processors to determine a HARQ process identifier for a communication between the UE and a base station using an SPS configuration or a CG configuration, wherein the determination of the HARQ process identifier is based at least in part on an offset applied for the determination of the HARQ process identifier; and performing the communication based at least in part on the HARQ process identifier.

In some aspects, a non-transitory computer-readable medium may store one or more instructions for wireless communication. The one or more instructions, when executed by one or more processors of a base station, may cause the one or more processors to determine a HARQ process identifier for a communication between the base station and a UE using a SPS configuration or a CG configuration, wherein the determination of the HARQ process identifier based at least in part on an offset applied for the determination of the HARQ process identifier; and perform the communication based at least in part on the HARQ process identifier.

In some aspects, an apparatus for wireless communication may include means for determining a HARQ process identifier for a communication between the UE and a base station using a SPS configuration or a CG configuration, wherein the determination of the HARQ process identifier is based at least in part on an offset applied for the determination of the HARQ process identifier; and means for performing the communication based at least in part on the HARQ process identifier.

In some aspects, an apparatus for wireless communication may include means for determining a HARQ process identifier for a communication between the base station and a UE using a SPS configuration or a CG configuration, wherein the determination of the HARQ process identifier based at least in part on an offset applied for the determination of the HARQ process identifier; and means for performing the communication based at least in part on the HARQ process identifier.

In some aspects, a method of wireless communication, performed by a user equipment (UE), may include determining a hybrid automatic repeat request (HARQ) process identifier for a communication between the UE and a base station using a semi-persistent scheduling (SPS) configuration or a configured grant (CG) configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; and performing the communication based at least in part on the HARQ process identifier.

In some aspects, a method of wireless communication, performed by a base station, may include determining a HARQ process identifier for a communication between the base station and a UE using an SPS configuration or a CG configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; and performing the communication based at least in part on the HARQ process identifier.

In some aspects, a UE for wireless communication may include memory and one or more processors operatively coupled to the memory. The memory and the one or more processors may be configured to determine a HARQ process identifier for a communication between the UE and a base station using an SPS configuration or a CG configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; and perform the communication based at least in part on the HARQ process identifier.

In some aspects, a base station for wireless communication may include memory and one or more processors operatively coupled to the memory. The memory and the one or more processors may be configured to determine a HARQ process identifier for a communication between the base station and a UE using an SPS configuration or a CG configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; and perform the communication based at least in part on the HARQ process identifier.

In some aspects, a non-transitory computer-readable medium may store one or more instructions for wireless communication. The one or more instructions, when executed by one or more processors of a UE, may cause the one or more processors to: determine a HARQ process identifier for a communication between the UE and a base station using an SPS configuration or a CG configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; and perform the communication based at least in part on the HARQ process identifier.

In some aspects, a non-transitory computer-readable medium may store one or more instructions for wireless communication. The one or more instructions, when executed by one or more processors of a base station, may cause the one or more processors to: determine a HARQ process identifier for a communication between the base station and a UE using an SPS configuration or a CG configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; and perform the communication based at least in part on the HARQ process identifier.

In some aspects, an apparatus for wireless communication may include means for determining a HARQ process identifier for a communication between the apparatus and a base station using an SPS configuration or a CG configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; and means for performing the communication based at least in part on the HARQ process identifier.

In some aspects, an apparatus for wireless communication may include means for determining a HARQ process identifier for a communication between the apparatus and a UE using an SPS configuration or a CG configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; and means for performing the communication based at least in part on the HARQ process identifier.

Aspects generally include a method, apparatus, system, computer program product, non-transitory computer-readable medium, user equipment, base station, wireless communication device, and/or processing system as substantially described herein with reference to and as illustrated by the accompanying drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
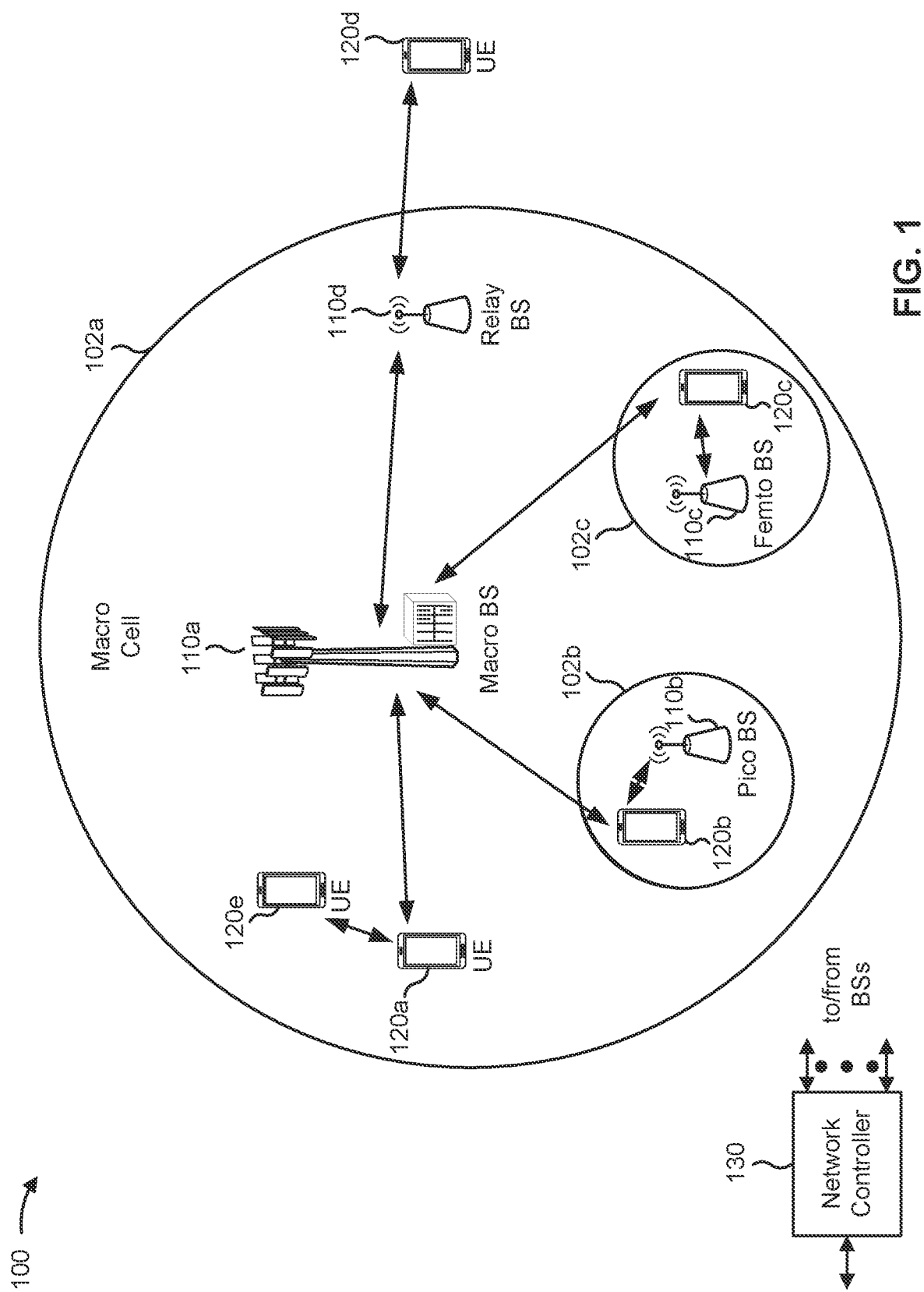
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
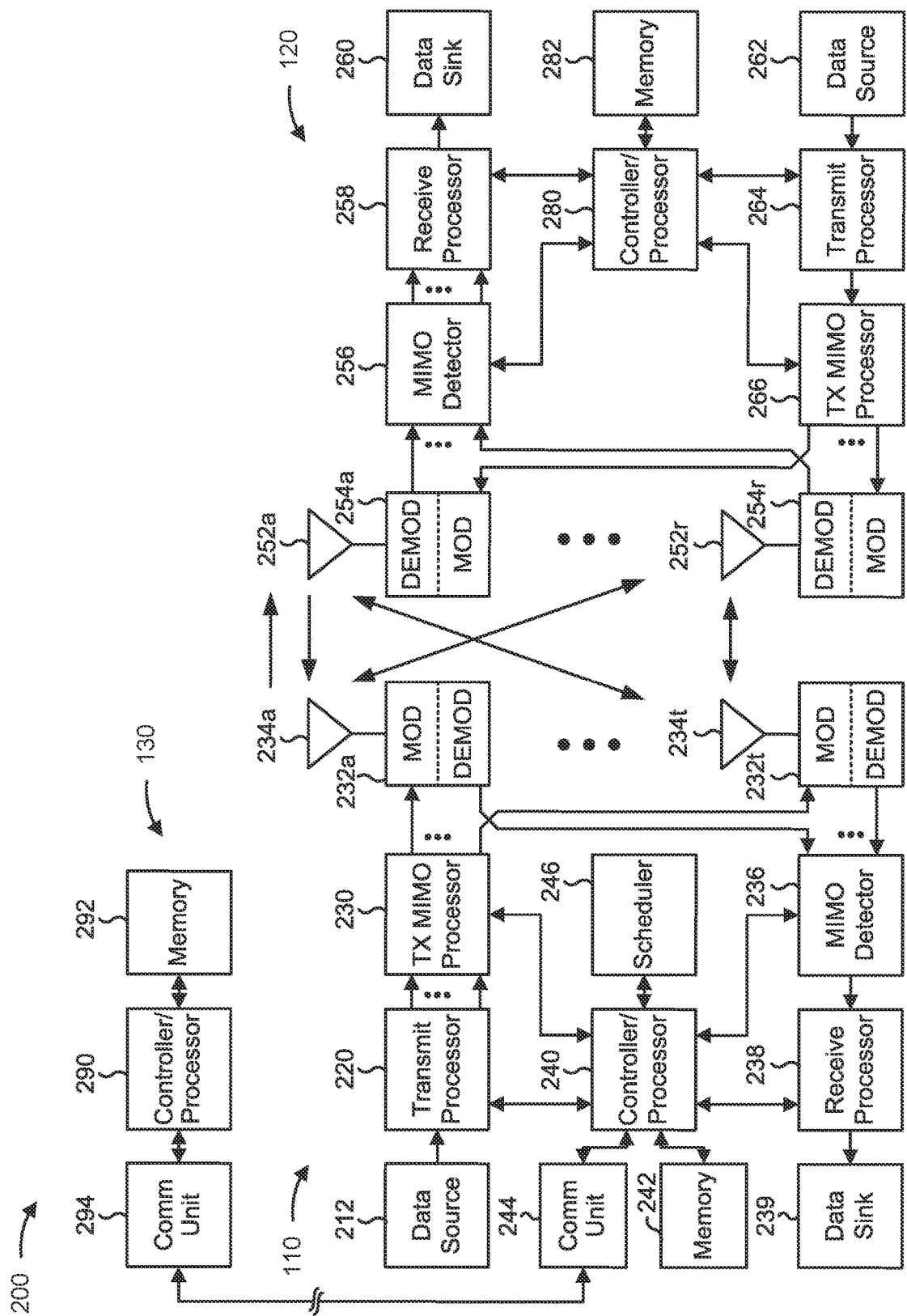
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with hybrid automatic repeat request (HARD) process identifier determination, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 600 of FIG. 6, process 700 of FIG. 7, and/or other processes as described herein. A scheduler 246 may schedule UEs for data transmission on the downlink and/or uplink.

In some aspects, UE 120 may include means for determining a HARQ process identifier for a communication between the UE and a base station using a semi-persistent scheduling (SPS) configuration or a configured grant (CG) configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; means for performing the communication based at least in part on the HARQ process identifier; determining a HARQ process identifier for a communication between the UE and a base station using an SPS configuration or a CG configuration, wherein the determination of the HARQ process identifier is based at least in part on an offset applied for the determination of the HARQ process identifier; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, base station 110 may include means for determining a HARQ process identifier for a communication between the base station and a UE for an SPS configuration or a CG configuration, wherein the determination of the HARQ process identifier is configured to avoid a repetition or an incomplete cycle of the HARQ process identifier associated with a system frame number wraparound value based at least in part on at least one of: an assignment index associated with the HARQ process identifier, a modified frame number value used to determine the HARQ process identifier, or an offset applied for the determination of the HARQ process identifier that prevents the repetition or the incomplete cycle; means for performing the communication based at least in part on the HARQ process identifier; means for determining a HARQ process identifier for a communication between the base station and a UE using an SPS configuration or a CG configuration, wherein the determination of the HARQ process identifier based at least in part on an offset applied for the determination of the HARQ process identifier; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

A base station and a UE may communicate using a HARQ mechanism, which may provide for the retransmission of an unsuccessfully received initial transmission. HARQ may be used in the uplink or the downlink. The base station and the UE may perform HARQ communications based at least in part on a HARQ process identifier. For example, the HARQ process identifier may correspond to a HARQ process, and may cycle through a set of values across slots. As an example, consider a communication with a 1 ms periodicity, such as a downlink communication associated with an SPS configuration or an uplink communication associated with a CG configuration. In this case, a HARQ process identifier for two HARQ processes may be defined as follows:

| Current Slot | 0 | 1 | 2 | 3 | ... |
|---|---|---|---|---|---|
| HARQ Process ID | 0 | 1 | 0 | 1 | ... |

Similarly, a HARQ process identifier for three HARQ processes may be defined as follows:

| Current Slot | 0 | 1 | 2 | 3 | ... |
|---|---|---|---|---|---|
| HARQ Process ID | 0 | 1 | 0 | 1 | ... |

More generally, the HARQ process identifier may be equal to: (Current Slot) modulo(Number of HARQ processes). The HARQ process identifier provides for the differentiation of slots associated with different HARQ processes and reduces the likelihood of collision of retransmissions for different HARQ processes.

A UE may communicate in connection with a HARQ process based at least in part on a system frame number (SFN) that is known to the UE and the base station. For example, the current slot value shown above may be based at least in part on the SFN. More particularly, SFNs may be in a range of 0 to 1023, and each SFN may include one or more slots based at least in part on a numerology associated with a carrier. When each SFN includes 10 slots, the current slot values may include [0 1 2 3 4 . . . 10238 10239], and after slot 10239, the SFN and slot number may wrap around to 0. The SFN wraparound value of the carrier may identify the value at which the SFN wraps around to 0. For example, in the above example, the SFN wraparound value is 1023.

For a configured downlink assignment, such as an SPS configuration, the HARQ process identifier associated with the slot where the downlink transmission starts may be derived from the following equation:

HARQ Process ID=[floor(CURRENT_slot×10/(numberOfSlotsPerFrame×periodicity))]modulo nrofHARQ-Processes, where CURRENT_slot corresponds to the slot where the downlink transmission starts, numberOfSlotsPerFrame defines the number of slots in a system frame, periodicity identifies a periodicity of the SPS configuration, and nrofHARQ-Processes identifies a number of HARQ processes configured for the UE. CURRENT_slot may be defined as (SFN×numberOfSlotsPerFrame)+slot number in the frame.

For a configured grant (e.g., for an uplink transmission of the UE), the HARQ process identifier associated with the first symbol of the uplink transmission may be derived from the following equation:

HARQ Process ID=[floor(CURRENT_symbol/periodicity)]modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot), and where numberOfSlotsPerFrame and numberOfSymbolsPerSlot refer to the number of consecutive slots per frame and the number of consecutive symbols per slot, respectively.

Some techniques for determining the HARQ process identifier, such as those described above for configured grants and configured downlink assignments, may cause the same HARQ process identifier to be used for two consecutive uplink or downlink assignments, or may cause an incomplete cycle of the HARQ process identifier. For example, consider an SPS configuration with a periodicity of 1 ms and a subcarrier spacing of 15 kHz (and hence, 10 slots per frame). If the SPS configuration uses 3 HARQ processes, the same HARQ process identifier (referred to herein as a repetition of the HARQ process identifier) will be used for the last slot of SFN 1023 (i.e., the SFN wraparound value) and the first slot of SFN 0:

| CURRENT_slot | 10237 | 10238 | 10239 | 0 | 1 | 2 |
|---|---|---|---|---|---|---|
| HARQ process ID | 1 | 2 | 0 | 0 | 1 | 2 |

Now consider an SPS configuration with 3 HARQ processes and a periodicity of 3 ms. In this case, the HARQ process identifier may be associated with an incomplete cycle, in which the HARQ process identifier does not perform a full cycle through 0, 1, and 2 values before returning to a 0 value after the SFN wraparound value:

| CURRENT_slot | 10229 | 10232 | 10235 | 10238 | 1 | 4 |
|---|---|---|---|---|---|---|
| HARQ process ID | 1 | 2 | 0 | 1 | 0 | 1 |

This repetition or incomplete cycle may occur for SPS configurations because the number of HARQ processes may not be a divisor of Floor[(1024×10)/(periodicity)) or Ceil [(1024×10)/(periodicity)]. Similarly, the repetition or incomplete cycle may occur for CG configurations because the number of HARQ processes may not be a divisor of Floor[(1024×numberOfSymbolsPerSlot)/(periodicity)] or Ceil[(1024×numberOfSymbolsPerSlot)/(periodicity)]. The repetition or incomplete cycle can prevent transmission or reception of a new packet in the second of the two consecutive assignments. For example, the UE may be prohibited from reception of a new transmission before transmission of an ACK associated with the same HARQ process as the new transmission (e.g., the UE may not be expected to receive another physical downlink shared channel (PDSCH) for a given HARQ process until after the end of the expected transmission of HARQ acknowledgment (ACK) for that HARQ process). Furthermore, retransmissions and all ACKs of packets sent in the first of the two consecutive occasions may have to be completed before the second occasion, which may be difficult or impossible (e.g., when the SPS/CG has low periodicity) in the case of repetition. Also, retransmissions and all ACKs of packets sent in the last occasion prior to the SFN wraparound using a same HARQ process identifier as second of the two consecutive occasions may have to be completed before the second occasion, which may be difficult in the case of an incomplete cycle.

Some techniques and apparatuses described herein provide for determination of a HARQ process identifier, wherein the determination of the HARQ process identifier is configured to avoid a repetition or an incomplete cycle of the HARQ process identifier. For example, techniques and apparatuses described herein may avoid the repetition or the incomplete cycle after an SFN wraparound value based at least in part on an assignment index associated with the HARQ process identifier, a modified frame number value used to determine the HARQ process identifier, or an offset applied for determination of the HARQ process identifier. Thus, interruption of uplink or downlink traffic may be reduced and throughput may be increased.

Figure 3:
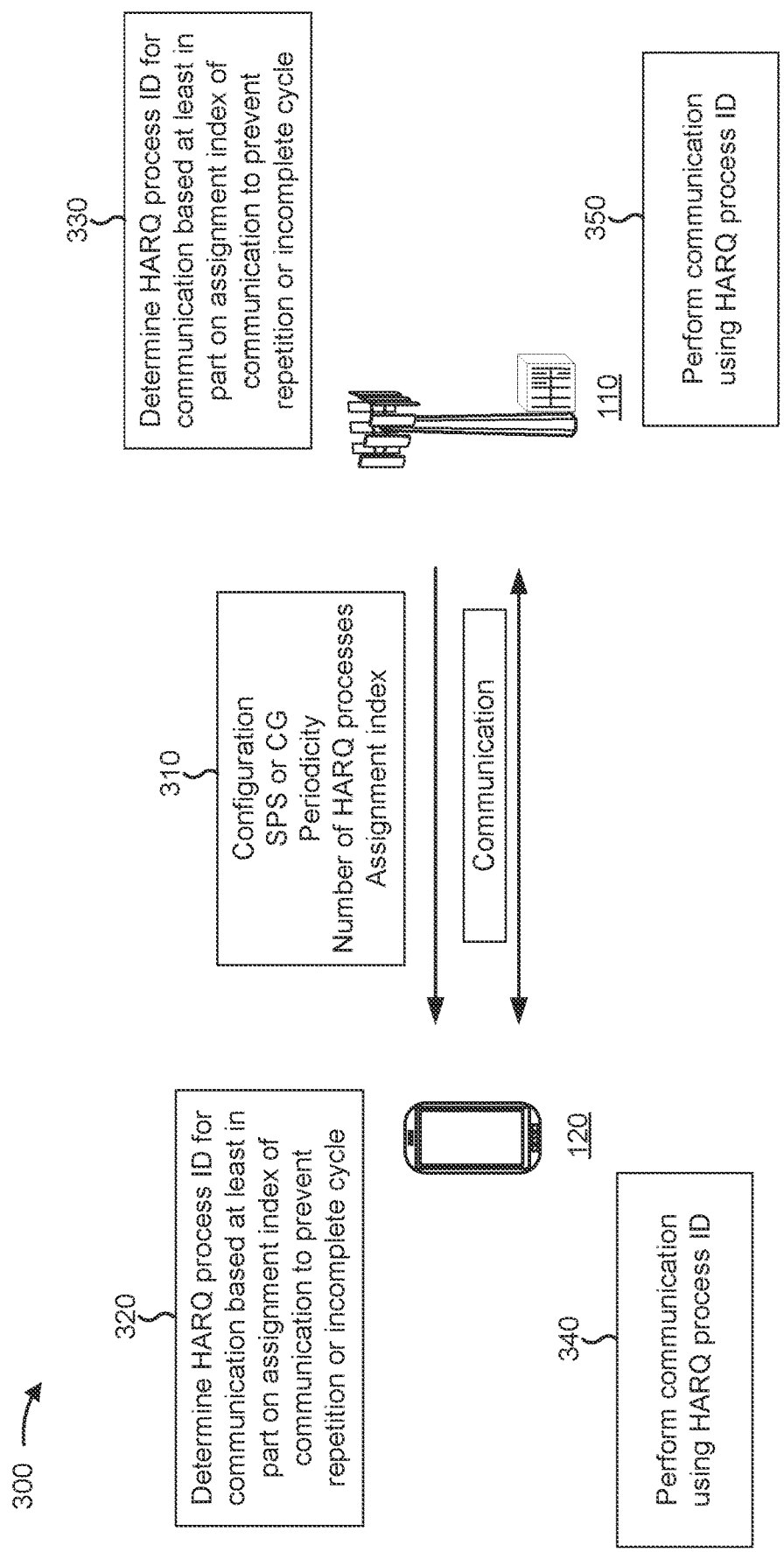
FIG. 3 is a diagram illustrating an example of hybrid automatic repeat request (HARQ) process identifier determination based at least in part on an assignment index, in accordance with various aspects of the present disclosure.

FIG. 3 is a diagram illustrating an example 300 of HARQ process identifier determination based at least in part on an assignment index, in accordance with various aspects of the present disclosure. As shown, example 300 includes a UE 120 and a BS 110. In examples 300, 400 (shown in FIG. 4), and 500 (shown in FIG. 5), the UE 120 and the BS 110 are associated with SFN wraparound values of 1023, meaning that SFNs of communications between the UE 120 and the BS 110 increment from 0 to 1023, then back to 0 (e.g., [0 1 2 3 ... 1022 1023 0 1 2 3 ... 1022 1023 0 1 2 ...]). If HARQ process identifiers of the communications between the UE 120 and the BS 110 are determined using some legacy approaches, such as those described above, then the HARQ process identifier may repeat or may be associated with an incomplete cycle at the SFN wraparound value.

As shown in FIG. 3, and by reference number 310, the BS 110 may provide configuration information to configure a downlink communication (e.g., using an SPS configuration and/or the like) or an uplink communication (e.g., using a CG configuration and/or the like). As shown, the configuration information may indicate a periodicity of the configured downlink communication or the configured uplink communication, a number of HARQ processes associated with the UE 120, and/or the like. As further shown, the configuration information may indicate an assignment index (e.g., a downlink assignment index or an uplink assignment index). An assignment index may identify data that is bundled as part of a HARQ ACK/NACK transmission. The value of the assignment index may be provided to the UE 120 by the BS 110, and the UE 120 and/or the BS 110 may determine a HARQ process identifier using the assignment index, as described below.

As shown by reference numbers 320 and 330, the UE 120 and/or the BS 110 may determine a HARQ process identifier (ID) for a communication based at least in part on the assignment index of the communication. For example, the determination of the HARQ process identifier may be configured to prevent or mitigate a repetition or an incomplete cycle of the HARQ process identifier associated with an SFN wraparound value. As a particular example, the UE 120 or the BS 110 may determine the HARQ process identifier using the assignment index as follows:

HARQ Process ID=(N)modulo nrofHARQ-Processes, for assignment index N.

Determining the HARQ process identifier using the assignment index may be less processor-intensive than other methods of determining the HARQ process identifier, and may mitigate or eliminate repetition or an incomplete cycle at an SFN wraparound value.

In some aspects, the assignment index may be reset during activation downlink control information (DCI) reception. In this case, the UE 120 and/or the BS 110 may use an offset in the above calculation to prevent a repetition or an incomplete cycle. For example, the offset may be transmitted via radio resource control (RRC) signaling or in the activation DCI, or may be determined by the UE 120.

As shown by reference numbers 340 and 350, the UE 120 and the BS 110 may perform a communication (e.g., an uplink communication or a downlink communication) based at least in part on the HARQ process identifier. For example, the UE 120 or the BS 110 may transmit an initial transmission, HARQ feedback, a retransmission, and/or the like in accordance with the HARQ process identifier. By determining the HARQ process identifier based at least in part on the assignment index, the UE 120 and/or the BS 110 may reduce the likelihood of interruption of a subsequent transmission, thereby improving HARQ performance (e.g., number of retransmission opportunities or ACK/NACK feedback opportunities) for the UE 120 and the BS 110.

As indicated above, FIG. 3 is provided as an example. Other examples may differ from what is described with respect to FIG. 3.

Figure 4:
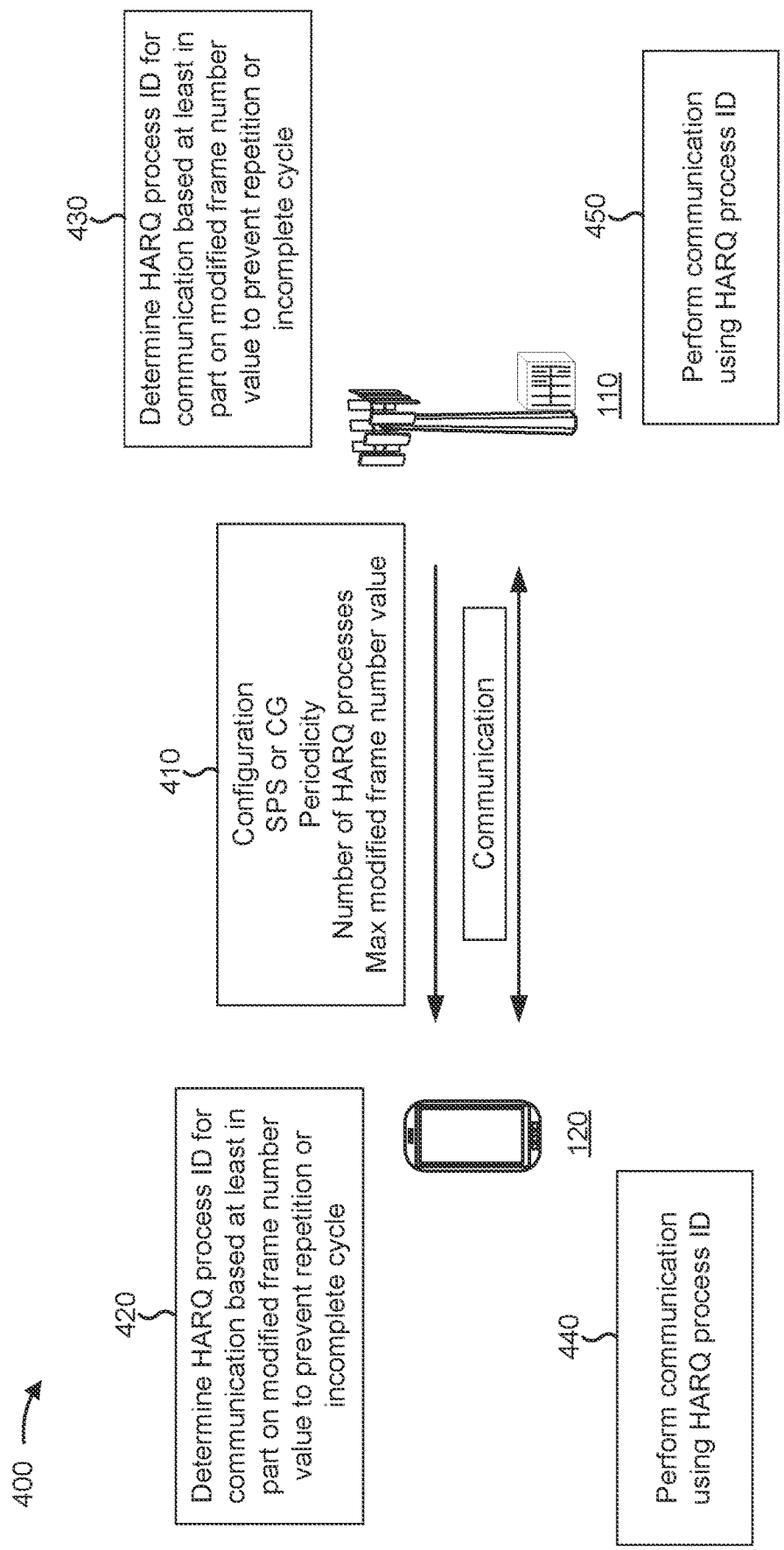
FIG. 4 is a diagram illustrating an example of HARQ process identifier determination based at least in part on a modified frame number value, in accordance with various aspects of the present disclosure.

FIG. 4 is a diagram illustrating an example 400 of HARQ process identifier determination based at least in part on a modified frame number value, in accordance with various aspects of the present disclosure. As shown, example 400 includes a UE 120 and a BS 110.

As shown in FIG. 4, and by reference number 410, the BS 110 may provide configuration information to the UE 120. As further shown, the configuration information may identify a maximum modified frame number value. The UE 120 and the BS 110 may use a modified frame number value to determine a HARQ process identifier that does not repeat or have an incomplete cycle at an SFN wraparound value, as described in more detail below. The maximum modified frame number value may identify a maximum value of the modified frame number value. In some aspects, the configuration information may indicate a modified frame number value and/or the maximum modified frame number value. The determination and usage of the modified frame number value is described in more detail below.

As shown by reference numbers 420 and 430, the BS 110 and the UE 120 may determine a HARQ process identifier for a communication based at least in part on a modified frame number. The usage of the modified frame number may prevent repetition or an incomplete cycle of the HARQ process identifier.

The modified frame number may be used in place of a system frame number in one or more of the operations used to determine the HARQ process identifier. For example, if the periodicity of the SPS configuration or CG configuration is measured in units of milliseconds, then the UE 120 and/or the BS 110 may determine the HARQ process identifier in accordance with:

HARQ Process ID=[floor(CURRENT_slot×10/numberOfSlotsPerFrame×periodicity))]modulo nrofHARQ-Processes, where CURRENT_slot=[(EFN×numberOfSlotsPerFrame)+slot number in the frame], EFN stands for extended frame number value, and numberOfSlotsPerFrame refers to the number of consecutive slots per frame. If the periodicity of the SPS configuration or CG configuration is measured in units of slots, then the UE 120 and/or the BS 110 may determine the HARQ process identifier in accordance with:

HARQ Process ID=[floor(CURRENT_slot/periodicity))]modulo nrofHARQ-Processes.

If the periodicity of the SPS configuration or CG configuration is measured in units of symbols, then the UE 120 and/or the BS 110 may determine the HARQ process identifier in accordance with:

HARQ Process ID=[floor(CURRENT_symbol/periodicity))]modulo nrofHARQ-Processes, where CURRENT_symbol=[(EFN×numberOfSymbolsPerSlot×numberOfSlotsPerFrame)+slot number in the frame×numberOfSymbolsPerSlot+symbol number in the slot].

The maximum extended frame number value used in connection with the extended frame number value may be defined as a value that prevents a repetition or an incomplete cycle of the HARQ process identifier. In some aspects, the maximum extended frame number value may be different than the SFN wraparound value. As a first example, if the periodicity is measured in units of milliseconds, the maximum extended frame number value may be determined as a smallest integer greater than 1024 or a largest integer less than 1024 such that one or more of nrofHARQ-Processes and periodicity are divisors of (EFN_max×10), where EFN_max is the maximum extended frame number value. As a second example, if the periodicity is measured in units of slots, EFN_max may be defined as a smallest integer greater than 1024 or a largest integer less than 1024 such that one or more of nrofHARQ-Processes and periodicity are divisors of (EFN_max×numberOfSlotsPerFrame). As a third example, if the periodicity is measured in units of symbols, EFN_max may be defined as a smallest integer greater than 1024 or largest integer less than 1024 such that one or more of nrofHARQ-Processes and periodicity are divisors of (EFN_max×numberOfSlotsPerFrame×numberOfSymbolsPerSlot). Each of the above configurations may prevent a repetition or an incomplete cycle of the HARQ process identifier at an SFN wraparound value.

As shown by reference numbers 440 and 450, the UE 120 and the BS 110 may perform the communication using the HARQ process identifier. This is described in more detail above in connection with FIG. 3.

As indicated above, FIG. 4 is provided as an example. Other examples may differ from what is described with respect to FIG. 4.

Figure 5:
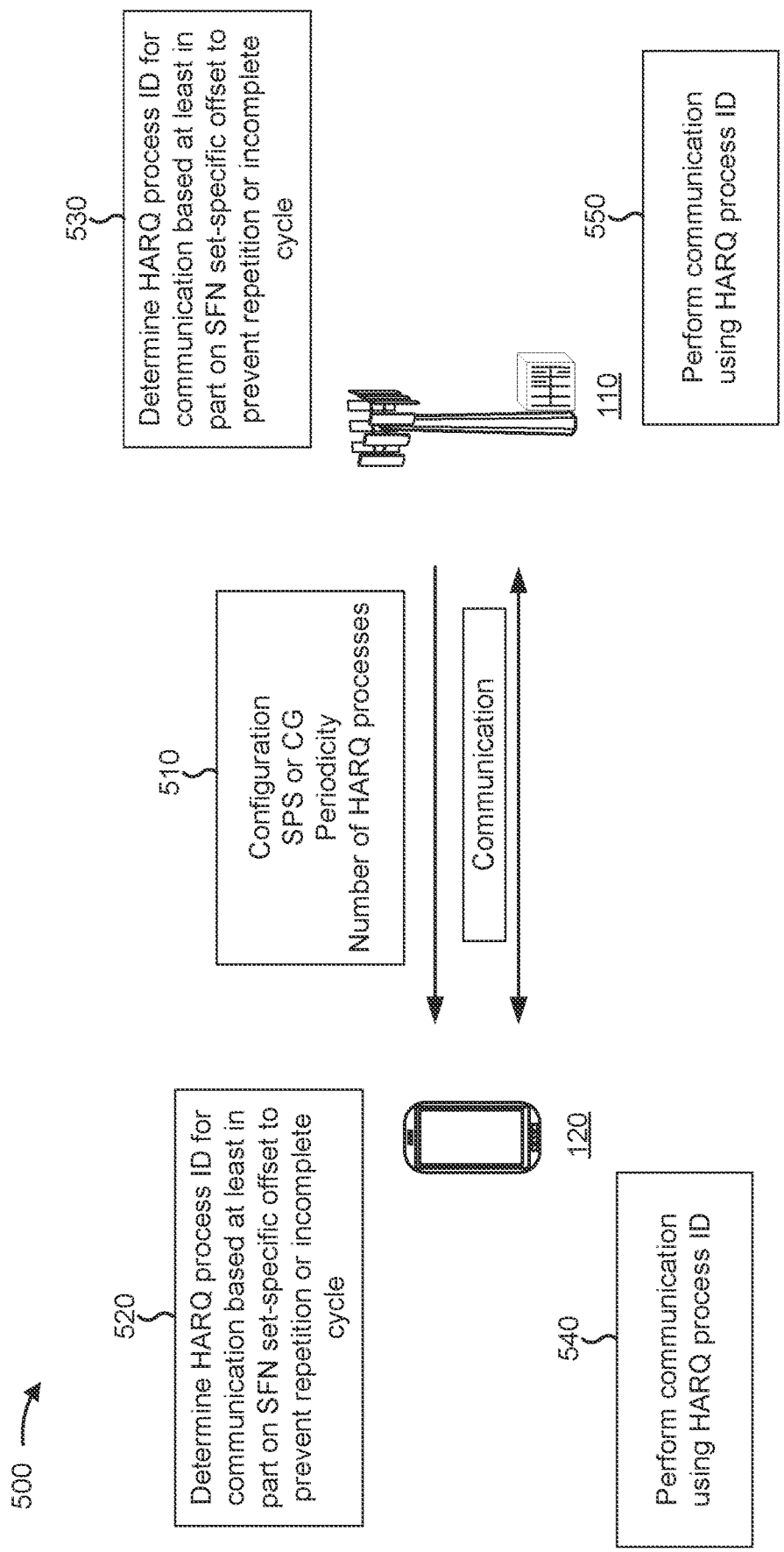
FIG. 5 is a diagram illustrating an example of HARQ process identifier determination based at least in part on an offset, in accordance with various aspects of the present disclosure.

FIG. 5 is a diagram illustrating an example 500 of HARQ process identifier determination based at least in part on an offset, in accordance with various aspects of the present disclosure. As shown, example 500 includes a UE 120 and a BS 110.

As shown in FIG. 5, the BS 110 may provide configuration information 510 to the UE 120. This is described in more detail above in connection with FIGS. 3 and 4. The configuration information 510 may be provided via radio resource control signaling, medium access control signaling, and/or the like.

As shown by reference numbers 520 and 530, the UE 120 and/or the BS 110 may determine a HARQ process identifier for a communication associated with the configuration information based at least in part on an offset. For example, the UE 120 and/or the BS 110 may determine the HARQ process identifier as follows:

HARQ Process ID=[offset+floor(CURRENT_slot×10/(numberOfSlotsPerFrame×periodicity))] modulo nrofHARQ-Processes.

The offset may be specific to a set of SFNs, such as a set of SFNs 0-1023. The offset may be configured to prevent a repetition or an incomplete cycle of the HARQ process identifier associated with the SFN wraparound value. As an example, consider the below table 1, which shows a current slot value, a legacy HARQ process identifier (e.g., which includes a repetition at the SFN wraparound value), the offset, and the HARQ process identifier that takes into account the offset, thereby eliminating the repetition:

TABLE 1

| CURRENT_slot | 10237 | 10238 | 10239 | 0 | 1 | 2 |
|---|---|---|---|---|---|---|
| Legacy HARQ process ID | 1 | 2 | 0 | 0 | 1 | 2 |
| Offset | 0 | 0 | 0 | 1 | 1 | 1 |
| Offset HARQ process ID | 1 | 2 | 0 | 1 | 2 | 0 |

As shown in the above table, the legacy HARQ process identifier includes two consecutive zero values at a last slot of a first set of SFNs (e.g., slot 10239) and a first slot of a second set of SFNs (e.g., slot 0). The offset of the first set of SFNs is 0 and the offset of the second set of SFNs is 1. If a third set of SFNs were shown in the above table, such as a set of SFNs occurring after the second set of SFNs, then the offset of the third set of SFNs might be 2. As further shown, the offset HARQ process identifier does not include the repetition.

In some aspects, the offset may be provided in the configuration information 510. In some aspects, the offset may be preconfigured (e.g., at activation, specified in a wireless communication standard, and/or the like). In some aspects, the offset may be provided using a radio resource control parameter, such as harq-ProcID-Offset2 or harq-ProcID-Offset.

In some aspects, the offset may be a first offset. The UE 120 may be configured with a second offset, in addition to or as an alternative to the first offset, that is based at least in part on whether the communication is associated with an SPS configuration or a CG configuration. For example, the first offset may be associated with one of the SPS configuration or the CG configuration, and the second offset may be associated with the other of the SPS configuration or the CG configuration. The UE 120 and/or the B S 110 may use the first offset and/or the second offset to determine the HARQ process identifier. For example, for configured downlink assignments of SPS the HARQ Process ID associated with the slot where a downlink transmission starts may be derived from the following equation:

HARQ Process ID=[floor(CURRENT_slot×10/(numberOfSlotsPerFrame×periodicity))]modulo nrofHARQ-Processes+offsetforSPS_*i* where CURRENT_slot=[(SFN×numberOfSlotsPerFrame)+slot number in the frame], numberOfSlotsPerFrame refers to the number of consecutive slots per frame, and offsetforSPS_i is an offset, such as identified by harq-ProcID-Offset.

Similarly, for configured uplink grants of CG j, the HARQ Process ID associated with the first symbol of an uplink transmission may be derived from the following equation:

HARQ Process ID=[floor(CURRENT_symbol/periodicity)]modulo nrofHARQ-Processes+offsetforCQ_*j* where CURRENT_symbol=(SFN×numberOfSlotsPerFrame×numberOfSymbolsPerSlot+slot number in the frame×numberOfSymbolsPerSlot+symbol number in the slot), numberOfSlotsPerFrame and numberOfSymbolsPerSlot refer to the number of consecutive slots per frame and the number of consecutive symbols per slot, respectively, and offsetforCQ_j is an offset, such as identified by harq-ProcID-Offset2.

As shown by reference numbers 540 and 550, the UE 120 and the BS 110 may perform the communication in accordance with the HARQ process identifier. For example, the UE 120 or the BS 110 may transmit an initial transmission, HARQ feedback, a retransmission, and/or the like in accordance with the HARQ process identifier for a given subframe or slot. By determining the HARQ process identifier based at least in part on the offset, the UE 120 and/or the BS 110 may reduce the likelihood of interruption of a subsequent transmission, thereby improving HARQ performance (e.g., number of retransmission opportunities or ACK/NACK feedback opportunities) for the UE 120 and the BS 110.

As indicated above, FIG. 5 is provided as an example. Other examples may differ from what is described with respect to FIG. 5.

Figure 6:
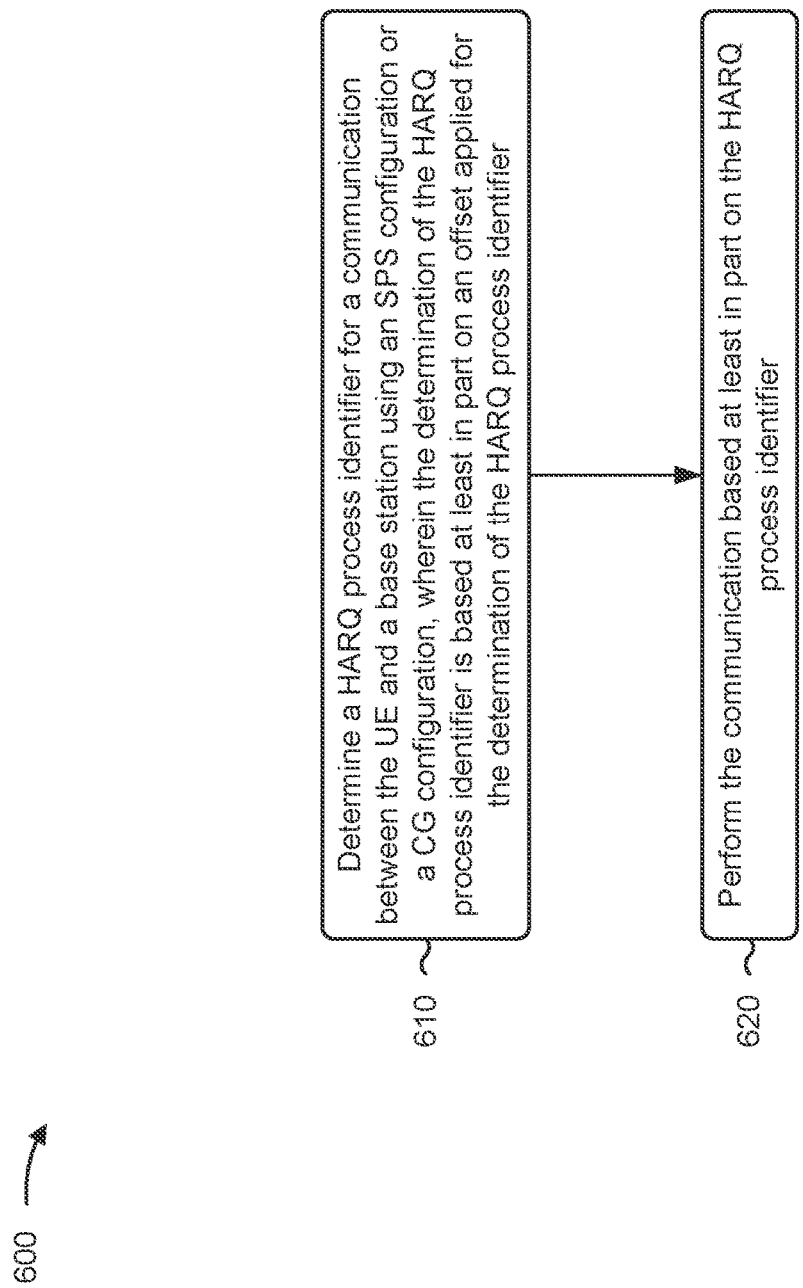
FIG. 6 is a diagram illustrating an example process performed, for example, by a user equipment, in accordance with various aspects of the present disclosure.

FIG. 6 is a diagram illustrating an example process 600 performed, for example, by a UE, in accordance with various aspects of the present disclosure. Example process 600 is an example where the UE (e.g., user equipment 120 and/or the like) performs operations associated with HARQ process identifier determination.

As shown in FIG. 6, in some aspects, process 600 may include determining a HARQ process identifier for a communication between the UE and a base station using an SPS configuration or a CG configuration, wherein the determination of the HARQ process identifier is based at least in part on an offset applied for the determination of the HARQ process identifier (block 610). For example, the UE (e.g., using receive processor 258, transmit processor 264, controller/processor 280, memory 282, and/or the like) may determine a HARQ process identifier for a communication between the UE and a base station using an SPS configuration (e.g., for downlink communication) or a CG configuration (e.g., for uplink communication). The determination of the HARQ process identifier may be based at least in part on an offset applied for the determination of the HARQ process identifier.

As further shown in FIG. 6, in some aspects, process 600 may include performing the communication based at least in part on the HARQ process identifier (block 620). For example, the UE (e.g., using receive processor 258, transmit processor 264, controller/processor 280, memory 282, and/or the like) may perform the communication based at least in part on the HARQ process identifier, as described above.

Process 600 may include additional aspects, such as any single aspect or any combination of aspects described below and/or in connection with one or more other processes described elsewhere herein.

In a first aspect, the offset is a first offset, and determining the HARQ process identifier is based at least in part on a second offset that is based at least in part on whether the communication is for the SPS configuration or the CG configuration.

In a second aspect, alone or in combination with the first aspect, the first offset is associated with the SPS configuration and the second offset is associated with the CG configuration.

In a third aspect, alone or in combination with one or more of the first through second aspects, the offset is configured using radio resource control signaling or an activation downlink control information.

In a fourth aspect, alone or in combination with one or more of the first through third aspects, the offset is determined by the UE.

In a fifth aspect, alone or in combination with one or more of the first through fourth aspects, the offset comprises a first value for a set of system frame numbers before the system frame number wraparound value, and a second value for a set of system frame numbers after the system frame number wraparound value.

In a sixth aspect, alone or in combination with one or more of the first through fifth aspects, the offset comprises respective values for a plurality of sets of system frame numbers, wherein each set of system frame numbers, of the plurality of sets of system frame numbers, comprises system frame numbers 0 through N, where N is a system frame number wraparound value.

In a seventh aspect, alone or in combination with one or more of the first through sixth aspects, the offset prevents a repetition or an incomplete cycle associated with a system frame number wraparound value.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
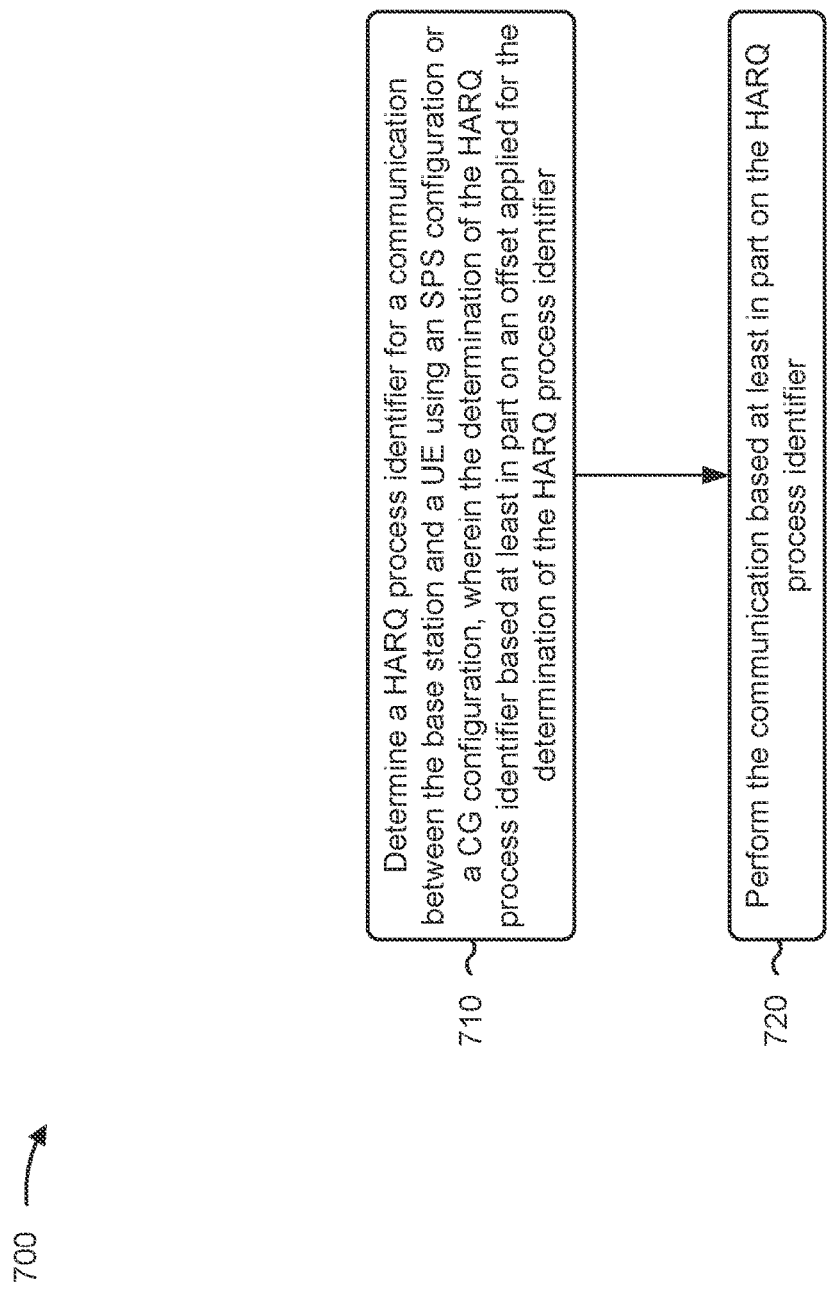
FIG. 7 is a diagram illustrating an example process performed, for example, by a base station, in accordance with various aspects of the present disclosure.

FIG. 7 is a diagram illustrating an example process 700 performed, for example, by a base station, in accordance with various aspects of the present disclosure. Example process 700 is an example where the base station (e.g., base station 110 and/or the like) performs operations associated with HARQ process identifier determination.

As shown in FIG. 7, in some aspects, process 700 may include determining a HARQ process identifier for a communication between the base station and a UE using an SPS configuration or a CG configuration, wherein the determination of the HARQ process identifier based at least in part on an offset applied for the determination of the HARQ process identifier (block 710). For example, the base station (e.g., using controller/processor 240 and/or the like) may determine a HARQ process identifier for a communication between the base station and a UE using an SPS configuration or a CG configuration, as described above. In some aspects, the determination of the HARQ process identifier is based at least in part on an offset applied for the determination of the HARQ process identifier.

As further shown in FIG. 7, in some aspects, process 700 may include performing the communication based at least in part on the HARQ process identifier (block 720). For example, the base station (e.g., using antenna 234, DEMOD 232, MIMO detector 236, receive processor 238, controller/processor 240, and/or the like) may perform the communication based at least in part on the HARQ process identifier, as described above.

Process 700 may include additional aspects, such as any single aspect or any combination of aspects described below and/or in connection with one or more other processes described elsewhere herein.

In a first aspect, the offset is a first offset, and determining the HARQ process identifier is based at least in part on a second offset that is based at least in part on whether the communication is for the SPS configuration or the CG configuration.

In a second aspect, alone or in combination with the first aspect, the first offset is associated with the SPS configuration and the second offset is associated with the CG configuration.

In a third aspect, alone or in combination with one or more of the first through second aspects, the offset is configured using RRC signaling or an activation DCI.

In a fourth aspect, alone or in combination with one or more of the first through third aspects, the offset is determined by the base station.

In a fifth aspect, alone or in combination with one or more of the first through fourth aspects, the offset comprises a first value for a set of system frame numbers before the system frame number wraparound value, and a second value for a set of system frame numbers after the system frame number wraparound value.

In a sixth aspect, alone or in combination with one or more of the first through fifth aspects, the offset comprises respective values for a plurality of sets of system frame numbers.

In a seventh aspect, alone or in combination with one or more of the first through sixth aspects, the offset prevents a repetition or an incomplete cycle associated with a system frame number wraparound value.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   selecting a hybrid automatic repeat request (HARQ) process identifier for a communication between the UE and a base station using a semi-persistent scheduling (SPS) configuration or a configured grant (CG) configuration, a first value corresponding to the HARQ process identifier determined based at least in part on adding an offset value corresponding to an offset to a second value determined based at least in part on a system frame number, a number of consecutive slots per frame, a number of consecutive symbols per slot, a quantity of HARQ processes configured for the UE, and a periodicity associated with the SPS configuration or the CG configuration; and performing the communication in accordance with the HARQ process identifier.

2. The method of claim 1, wherein the offset prevents a repetition or an incomplete cycle associated with a system frame number wraparound value.

3. The method of claim 1, wherein the offset is a first offset, and wherein the HARQ process identifier is selected in accordance with a second offset for another communication for the SPS configuration, and
wherein the first offset is associated with a first set of system frame numbers and the second offset is associated with a second set of system frame numbers.

4. The method of claim 1, wherein the HARQ process identifier is additionally based at least in part on an offset applied for the selection of the HARQ process identifier at a wraparound occurrence in a current slot number.

5. The method of claim 1, wherein the offset is configured using radio resource control (RRC) signaling or activation downlink control information (DCI).

6. The method of claim 1, wherein the first value corresponding to the HARQ process identifier is determined in accordance with:

[floor(CURRENT_symbol/periodicity)]modulo nrof-HARQ-Processes+offsetforCG_j,

CURRENT_symbol=(SFN×numberOfSlotsPerFrame×numberOfSymbolsPerSlot+a slot number in a frame associated with the communication× numberOfSymbolsPerSlot+a symbol number in a slot of the frame), periodicity corresponding to a periodicity associated with the CG configuration, nrofHARQ-Processes corresponding to a quantity of HARQ processes that are configured for the UE, offsetforCG_j corresponding to the offset applied to the HARQ process identifier, SFN corresponds to a system frame number associated with the slot, numberOfSlotsPerFrame corresponding to a quantity of consecutive slots per frame, and numberOfSymbolsPerSlot corresponding to a quantity of consecutive symbols per slot.

7. A method of wireless communication performed by a base station, comprising:
selecting a hybrid automatic repeat request (HARQ) process identifier for a communication between the base station and a user equipment (UE) using a semi-persistent scheduling (SPS) configuration or a configured grant (CG) configuration, a first value corresponding to the HARQ process identifier determined based at least in part on adding an offset value corresponding to an offset to a second value determined based at least in part on a system frame number, a number of consecutive slots per frame, a number of consecutive symbols per slot, a quantity of HARQ processes configured for the UE, and a periodicity associated with the SPS configuration or the CG configuration; and
performing the communication in accordance with the HARQ process identifier.

8. The method of claim 7, wherein the offset prevents a repetition or an incomplete cycle associated with a system frame number wraparound value.

9. The method of claim 7, wherein the offset is a first offset, and wherein selecting the HARQ process identifier is according to a second offset in accordance with another communication for the SPS configuration, and
wherein the first offset is associated with a first set of system frame numbers and the second offset is associated with a second set of system frame numbers.

10. The method of claim 7, wherein the HARQ process identifier is additionally based at least in part on an offset applied for the selection of the HARQ process identifier at a wraparound occurrence in a current slot number.

11. The method of claim 7, wherein the offset is configured using radio resource control (RRC) signaling or activation downlink control information (DCI).

12. The method of claim 7, wherein the offset comprises a first value for a set of system frame numbers before a system frame number wraparound value, and a second value for the set of system frame numbers after the system frame number wraparound value.

13. The method of claim 7, wherein the offset comprises respective values for a plurality of sets of system frame numbers, wherein each set of system frame numbers, of the plurality of sets of system frame numbers, comprises system frame numbers 0 through N, where N is a system frame number wraparound value.

14. The method of claim 7, wherein the first value corresponding to the HARQ process identifier is determined in accordance with:

[floor(CURRENT_symbol/periodicity)]modulo nrof-HARQ-Processes+offsetforCG_j,

CURRENT_symbol=(SFN×numberOfSlotsPerFrame×numberOfSymbolsPerSlot+a slot number in a frame associated with the communication× numberOfSymbolsPerSlot+a symbol number in a slot of the frame), periodicity corresponding to a periodicity associated with the CG configuration, nrofHARQ-Processes corresponding to a quantity of HARQ processes that are configured for the UE, offsetforCG j corresponding to the offset applied to the HARQ process identifier, SFN corresponds to a system frame number associated with the slot, numberOfSlotsPerFrame corresponding to a quantity of consecutive slots per frame, and numberOfSymbolsPerSlot corresponding to a quantity of consecutive symbols per slot.

15. The method of claim 7, wherein the offset is determined by the base station.

16. A user equipment (UE) for wireless communication, comprising:
a processing system that includes processor circuitry and memory circuitry that stores code, the processing system configured to cause the UE to:
select a hybrid automatic repeat request (HARQ) process identifier for a communication between the UE and a base station using a semi-persistent scheduling (SPS) configuration or a configured grant (CG) configuration, a first value corresponding to the HARQ process identifier determined based at least in part on adding an offset value corresponding to an offset to a second value determined based at least in part on a system frame number, a number of consecutive slots per frame, a number of consecutive symbols per slot, a quantity of HARQ processes configured for the UE, and a periodicity associated with the SPS configuration or the CG configuration; and perform the communication in accordance with the HARQ process identifier.

17. The UE of claim 16, wherein the offset prevents a repetition or an incomplete cycle associated with a system frame number wraparound value.

18. The UE of claim 16, wherein the offset is a first offset, and wherein the HARQ process identifier is selected in accordance with a second offset for another communication for the SPS configuration, and
wherein the first offset is associated with a first set of system frame numbers and the second offset is associated with a second set of system frame numbers.

19. The UE of claim 16, wherein the HARQ process identifier is additionally based at least in part on an offset applied for the selection of the HARQ process identifier at a wraparound occurrence in a current slot number.

20. The UE of claim 16, wherein the offset is configured using radio resource control (RRC) signaling or activation downlink control information (DCI).

21. The UE of claim 16, wherein the first value corresponding to the HARQ process identifier is determined in accordance with:

[floor(CURRENT_symbol/periodicity)]modulo nrof-HARQ-Processes+offsetforCG_j,

CURRENT_symbol=(SFN×numberOfSlotsPerFrame×numberOfSymbolsPerSlot+a slot number in a frame associated with the communication×numberOfSymbolsPerSlot+a symbol number in a slot of the frame), periodicity corresponding to a periodicity associated with the CG configuration, nrofHARQ-Processes corresponding to a quantity of HARQ processes that are configured for the UE, offsetforCG_j corresponding to the offset applied to the HARQ process identifier, SFN corresponds to a system frame number associated with the slot, numberOfSlotsPerFrame corresponding to a quantity of consecutive slots per frame, and numberOfSymbolsPerSlot corresponding to a quantity of consecutive symbols per slot.

22. A base station for wireless communication, comprising:
a processing system that includes processor circuitry and memory circuitry that stores code, the processing system configured to cause the base station to:
select a hybrid automatic repeat request (HARQ) process identifier for a communication between the base station and a user equipment (UE) using a semi-persistent scheduling (SPS) configuration or a configured grant (CG) configuration, a first value corresponding to the HARQ process identifier determined based at least in part on adding an offset value corresponding to an offset to a second value determined based at least in part on a system frame number, a number of consecutive slots per frame, a number of consecutive symbols per slot, a quantity of HARQ processes configured for the UE, and a periodicity associated with the SPS configuration or the CG configuration; and
perform the communication in accordance with the HARQ process identifier.

23. The base station of claim 22, wherein the offset prevents a repetition or an incomplete cycle associated with a system frame number wraparound value.

24. The base station of claim 22, wherein the offset is a first offset, and wherein the HARQ process identifier is selected in accordance with a second offset for another communication for the SPS configuration, and
wherein the first offset is associated with a first set of system frame numbers and the second offset is associated with a second set of system frame numbers.

25. The base station of claim 22, wherein the HARQ process identifier is additionally based at least in part on an offset applied for the selection of the HARQ process identifier at a wraparound occurrence in a current slot number.

26. The base station of claim 22, wherein the offset is configured using radio resource control (RRC) signaling or activation downlink control information (DCI).

27. The base station of claim 22, wherein the offset is selected by the base station.

28. The base station of claim 22, wherein the offset comprises a first value for a set of system frame numbers before a system frame number wraparound value, and a second value for the set of system frame numbers after the system frame number wraparound value.

29. The base station of claim 22, wherein the offset comprises respective values for a plurality of sets of system frame numbers, wherein each set of system frame numbers, of the plurality of sets of system frame numbers, comprises system frame numbers 0 through N, where N is a system frame number wraparound value.

30. The base station of claim 22, wherein the first value corresponding to the HARQ process identifier is determined in accordance with:

[floor(CURRENT_symbol/periodicity)]modulo nrof-HARQ-Processes+offsetforCG_j,

CURRENT symbol=(SFN×numberOfSlotsPerFrame×numberOfSymbolsPerSlot+a slot number in a frame associated with the communication×numberOfSymbolsPerSlot+a symbol number in a slot of the frame), periodicity corresponding to a periodicity associated with the CG configuration, nrofHARQ-Processes corresponding to a quantity of HARQ processes that are configured for the UE, offsetforCG_j corresponding to the offset applied to the HARQ process identifier, SFN corresponds to a system frame number associated with the slot, numberOfSlotsPerFrame corresponding to a quantity of consecutive slots per frame, and numberOfSymbolsPerSlot corresponding to a quantity of consecutive symbols per slot.

\* \* \* \* \*